US009415925B2

(12) United States Patent
Lee et al.

(10) Patent No.: US 9,415,925 B2
(45) Date of Patent: Aug. 16, 2016

(54) METERING DEVICE

(71) Applicant: F. Holzer GMBH, St. Ingbert (DE)

(72) Inventors: Hyeck Hee Lee, Ingbert (DE); Frank Holzer, St. Ingbert (DE); Ute Steinfeld, St. Ingbert (DE); Markus Mahler, Voelklingen (DE)

(73) Assignee: F. HOLZER GMBH, St. Ingbert (DE)

( * ) Notice: Subject to any disclaimer, the term of this patent is extended or adjusted under 35 U.S.C. 154(b) by 0 days.

(21) Appl. No.: 13/788,236

(22) Filed: Mar. 7, 2013

(65) Prior Publication Data

US 2013/0200110 A1 Aug. 8, 2013

Related U.S. Application Data

(63) Continuation of application No. PCT/EP2011/004558, filed on Sep. 9, 2011.

(30) Foreign Application Priority Data

Sep. 10, 2010 (DE) ........................ 10 2010 045 059

(51) Int. Cl.
*G01F 11/00* (2006.01)
*B65D 83/00* (2006.01)
*B05B 11/00* (2006.01)

(52) U.S. Cl.
CPC .......... *B65D 83/0061* (2013.01); *B05B 11/007* (2013.01); *B05B 11/0064* (2013.01); *B05B 11/0067* (2013.01); *B05B 11/3001* (2013.01); *B05B 11/305* (2013.01); *B05B 11/3046* (2013.01); *B05B 11/3069* (2013.01); *B05B 11/3074* (2013.01); *B05B 11/3077* (2013.01); *B05B 11/0043* (2013.01)

(58) Field of Classification Search
CPC ........... B65D 83/0061; B05B 11/0061; B05B 11/0067; B05B 11/007; B05B 11/3001; B05B 11/3046; B05B 11/305; B05B 11/3069; B05B 11/3074; B05B 11/3077; B05B 11/0043
USPC ................. 222/321.6, 321.1, 321.9, 340, 256
See application file for complete search history.

(56) References Cited

U.S. PATENT DOCUMENTS 3,502,035 A * 3/1970 Fedit et al. .................... 417/480
4,607,765 A * 8/1986 Ruscitti ............... B05B 11/3074 222/321.2

(Continued)

FOREIGN PATENT DOCUMENTS

CN 1136641 A 11/1996
DE 2822115 A1 12/1978

(Continued)

OTHER PUBLICATIONS

English translation of the International Preliminary Report on Patentability mailed on Mar. 28, 2013 in connection with corresponding PCT Application No. PCT/EP2011/004558.

(Continued)

*Primary Examiner* — Patrick M Buechner
(74) *Attorney, Agent, or Firm* — Gesmer Updegrove LLP

(57) ABSTRACT

The invention relates to a metering device for metered dispensing of a fluid, in which a storage container is connected to a metering head, a spindle being guided in the metering head and having a through-channel for the fluid to be transported.

14 Claims, 8 Drawing Sheets

(56) References Cited

U.S. PATENT DOCUMENTS

| | | | | | |
|---|---|---|---|---|---|
| 4,728,008 | A * | 3/1988 | Graf et al. | 222/321.5 | |
| 4,732,549 | A * | 3/1988 | von Schuckmann | 417/472 | |
| 4,863,070 | A * | 9/1989 | Andris | 222/207 | |
| 5,152,434 | A * | 10/1992 | Birmelin | 222/207 | |
| 5,205,441 | A * | 4/1993 | Andris | 222/207 | |
| 5,232,687 | A | 8/1993 | Geimer | | |
| 5,238,156 | A * | 8/1993 | Andris | 222/207 | |
| 5,306,125 | A * | 4/1994 | Weag | 417/472 | |
| 5,307,962 | A * | 5/1994 | Lin | B05B 11/0064 | 222/321.9 |
| 5,326,237 | A | 7/1994 | Cecil et al. | | |
| 5,385,302 | A * | 1/1995 | Foster | B05B 1/3431 | 222/207 |
| 5,401,148 | A * | 3/1995 | Foster | B05B 11/0064 | 222/153.13 |
| 5,425,482 | A * | 6/1995 | Foster | B05B 1/3431 | 222/207 |
| 5,549,223 | A * | 8/1996 | Hori | B05B 11/0062 | 222/153.13 |
| 5,575,407 | A * | 11/1996 | Foster | B05B 1/3431 | 222/324 |
| 5,614,172 | A | 3/1997 | Geimer | | |
| 5,671,874 | A | 9/1997 | Behar et al. | | |
| 5,673,824 | A * | 10/1997 | Evans | 222/321.9 | |
| 5,692,649 | A * | 12/1997 | Schwab | 222/321.3 | |
| 6,053,368 | A * | 4/2000 | Geimer | 222/189.09 | |
| 6,193,112 | B1 * | 2/2001 | Santagiuliana | 222/153.13 | |
| 6,422,434 | B1 | 7/2002 | Lammond Wass et al. | | |
| 6,666,355 | B2 * | 12/2003 | Padar | 222/152 | |
| 6,755,327 | B1 * | 6/2004 | Hazard et al. | 222/209 | |
| 6,779,690 | B2 * | 8/2004 | Masuzzo et al. | 222/321.4 | |
| 6,851,583 | B2 * | 2/2005 | Masuzzo et al. | 222/321.6 | |
| 7,063,235 | B2 * | 6/2006 | Auer | 222/135 | |
| 7,111,761 | B2 * | 9/2006 | Masuda | 222/321.7 | |
| 2003/0047571 | A1 * | 3/2003 | Ramsey | B05B 11/3077 | 222/321.9 |
| 2003/0183655 | A1 * | 10/2003 | Padar | 222/321.9 | |
| 2004/0200860 | A1 * | 10/2004 | Buxmann | 222/321.6 | |
| 2005/0087564 | A1 * | 4/2005 | Marelli | B05B 11/0059 | 222/321.9 |
| 2005/0173459 | A1 * | 8/2005 | Buxmann | 222/321.6 | |
| 2007/0045348 | A1 * | 3/2007 | Schulte | B05B 11/3074 | 222/321.9 |
| 2007/0257060 | A1 * | 11/2007 | Young | B05B 11/3001 | 222/153.13 |
| 2010/0252581 | A1 * | 10/2010 | Greiner-Perth | 222/320 | |

FOREIGN PATENT DOCUMENTS

| | | | |
|---|---|---|---|
| DE | 19742890 | A1 | 4/1999 |
| DE | 10049898 | A1 | 10/2002 |
| DE | 10220557 | A1 | 11/2003 |
| EP | 0473892 | A2 | 6/1991 |
| EP | 0473892 | A2 | 3/1992 |
| EP | 1214984 | A2 | 6/2006 |
| RU | 2179075 | C1 | 2/2002 |
| SU | 776544 | A3 | 10/1980 |
| WO | 01/83010 | A1 | 11/2001 |
| WO | 2004058413 | A1 | 7/2004 |
| WO | 2009109370 | A1 | 9/2009 |

OTHER PUBLICATIONS

The International Search Report issued in connection with PCT Application No. PCT/EP2011/004558, mailed on Nov. 29, 2011.

English translation of the First Office Action issued by the State Intellectual Property Office of People's Republic of China on Jan. 19, 2015 in connection with related Chinese patent application No. 201180043202.9, 10 pages.

English translation of the Second Office Action issued by the State Intellectual Property Office of People's Republic of China on Sep. 8, 2015 in connection with related Chinese patent application No. 201180043202.9, 10 pages.

English translation of the Office Action issued by the Patent Office of the Russian Federation on Feb. 10, 2015 in connection with related Russian patent application No. 2013113678/05(020198), 4 pages.

Office Action issued by the German Patent and Trademark Office on Mar. 16, 2011 in connection with related German application No. 10 2010 045 059.6, 4 pages.

Third Office Action issued by the State Intellectual Property Office of People's Republic of China on May 10, 2016 in connection with related Chinese patent application No. 201180043202.9 and English translation thereof, 23 pages.

* cited by examiner

METERING DEVICE

The invention relates to a metering device for metered dispensing of a fluid, in which a storage container is connected to a metering head, a spindle being guided in the metering head and having a through-channel for the fluid to be transported.

Numerous metering devices for metered dispensing of a fluid are known in the state of the art.

Thus, e.g. in EP 0 473 892 A2, a fluid dispensing device for a sterile fluid is described, in which a storage container is connected to an actuation button and a piston-cylinder system is provided for transporting the fluid. In the case of such fluid dispensing devices, achieving adequate sealing is thereby problematic. Sealing of such a fluid dispensing device is important in particular for achieving a sterile system for sensitive fluids. Such fluid dispensing devices with a piston-cylinder system also have the disadvantage that the quantity to be conveyed cannot always be determined exactly. Such fluid dispensing devices, as are described in EP 0 473 892 A2, also present difficulties if eye drops are intended to be used as sterile fluid. For this application case, it is in fact important that a so-called "oligodynamic effect" is exploited. Producing such an oligodynamic effect is likewise not simple with piston-cylinder systems.

Starting herefrom, it is therefore the object of the present invention to propose a metering device in which, on the one hand, a high degree of sealing is achieved so that sterile administration of the fluid is possible and so that, with this system, an oligodynamic effect can be achieved in addition.

This object is achieved by a metering device having a feature combination according to patent claim 1. The subclaims reveal advantageous developments.

According to the invention, a metering device according to patent claim 1 is hence proposed, in which, in the operating state, a storage container is connected to a metering head, a spindle being guided in the metering head and having a through-channel which connects the outlet- and the inlet valve.

As a result of the configuration according to the invention of a spindle system instead of a piston-cylinder system, it has now been shown surprisingly that an extremely high degree of sealing of the system can consequently be achieved. As a result, a sterile and reliable metering of fluids is possible. The configuration according to the invention has the advantage in addition that the outlet valve can be configured in various ways due to the above-described design so that e.g. also a ball valve inter alia can be used. The advantage associated with using a ball valve is that the latter can be configured for example as a silver-coated metal ball so that an oligodynamic effect can hence be exerted. A further advantage of the metering device according to the invention resides in the fact that reliable metering, also precise from the point of view of volume, of the fluid to be administered can be achieved. The metering device according to the invention hence offers a high degree of sterility and operating reliability due to the novel spindle system.

Advantageously, the metering device according to the invention is thereby constructed such that the spindle is guided in the metering head and pump housing, the spindle which is configured as a cylindrical component having a central boring which then forms the through-channel. The advantage of such a construction resides in the fact that an optimal connection between the outlet and the inlet valve can consequently be produced. Preferably, the through-channel is thereby constructed then such that it is widened in the direction of the inlet valve. It is consequently achieved that the fluid to be suctioned in can be conveyed optimally into the through-channel in cooperation with the inlet valve. A further substantial element of the device according to the invention resides in the fact that the through-channel in the case of the spindle is then dimensioned in the direction of the outlet valve such that the outlet valve can engage in the through-channel. The through-channel is hence dimensioned and configured on the outlet side such that it cooperates then together with the outlet valve which can be configured in various ways in order to achieve optimum sealing. The through-channel should thereby preferably have a small length in order that a small residual volume can be achieved.

In the case of the metering device according to the invention, there can be disposed obviously in the storage container itself, as is already known for example in the state of the art, e.g. bellows or a foil bag. The bellows and the inner- or foil bag strive to return to their original position because of their intrinsic material thickness, as a result of which a suction force is produced which enables further improved sealing.

Preferably, the storage container is thereby a cylindrical container and the opening is disposed in a tapered region which is configured as a neck. In particular this embodiment of the storage container is preferred. The configuration of the neck is favourable such that then a locking connection can be disposed on the neck, on the outside, for connection of the metering head to the pump housing. In this embodiment, the locking connection hence connects the storage container to the pump housing and to the metering head. In the metering head, preferably a spring or bellows, preferably with an integrated sealing function, is/are thereby disposed between the inside of the metering head and the locking connection. As springs, preferably springs made of metal can hereby be used.

Furthermore, it has proved to be advantageous if the locking connection is connected via a first gasket to the opening of the storage container in order to improve the sealing. This first gasket is thereby disposed preferably on the end-side of the neck and can hence serve for sealing the locking connection to the pump housing. A further improvement can also be achieved if a second gasket, and in fact between the locking connection and the spindle, is provided in the interior of the pump housing. The spindle is then guided through this gasket.

As already explained initially, a great advantage of the metering device according to the invention resides in the fact that great variability with respect to the inlet- and outlet valve is possible because of the spindle system. Thus, for example the inlet valve, which is disposed on the pump housing in the interior in the direction of the container, can be configured in the form of a ball valve which is known per se in the state of the art or else a plastic material valve is used as inlet valve. The ball valve is thereby constructed as known per se in the state of the art, i.e. a ball is disposed in a valve seat and is conveyed as a result of the different pressure ratios such that the inlet opening is closed or open. If a ball valve is used, it can thereby be constructed such that it consists of two circular segments and the inner circular segment is lifted out of the circle plane by actuation of the spindle. As a result, opening is effected and in the converse case, also closing.

Various embodiments are also possible with respect to the outlet valve. Thus the outlet valve can also be configured in the form of a ball valve. In this case, the valve seat is then configured in the spindle itself. The ball and the spring which cooperate are disposed at the suitable position in the metering device and then cooperate with the valve seat.

Another possibility for configuring the outlet valve exists such that, instead of a ball, bellows or a valve piston are/is provided. Bellows-like springs which together with a plastic material cone form the outlet valve can be provided. Finally, the outlet valve can also be formed by a specially configured cone, the cone itself then having an outlet opening. This cone then cooperates, again as known in the case of a valve, with a ball and a spring.

In order to produce an oligodynamic effect, the balls which are provided in the valves can of course be coated with silver. Also ceramic balls, steel balls, glass balls or silver-copper balls can be used. In the case of the springs which are in operational connection with the balls, metal springs or even metal springs coated with plastic material or even plastic material springs can be used.

In the case of the metering device according to the invention, as already described initially, bellows or a plastic material- or a foil bag can be provided for storing the fluid. The bellows, as known per se from the state of the art, can thereby also have a drag piston. It is also preferred in the case of the metering device according to the invention if the bellows have a contact device at at least one fold which is in contact with the inside of the storage container. As a result, it can be achieved that, with the contact device, optimum sliding of the bellows via the contact device with the inside of the storage container is ensured. Likewise, it is consequently made possible that the bellows or the inner bag maintain/maintains the original position thereof.

From the point of view of choice of material, basically all materials which are known to the person skilled in the art can be used both for the bellows and for the foil bag. Preferred materials are polyamide (PA), polyethylene terephthalate (PET), polypropylene (PP), polyethylene (PE) and/or polyurethane (PU). In order to improve the oligodynamic effect, the metering head itself can also be selected from the above-mentioned materials, then in addition also an additive, and in fact preferably silver here, can be jointly incorporated. This additive will then come in contact with silver during actuation, i.e. when the fluid passes through the outlet opening, so that an oligodynamic effect can be achieved.

The metering device according to the invention can be used in particular for fluid or semi-solid contents, such as e.g. gels, ointments or creams.

The metering device according to the invention is described in more detail by means of the subsequent FIGS. 1 to 6.

Figure 1:
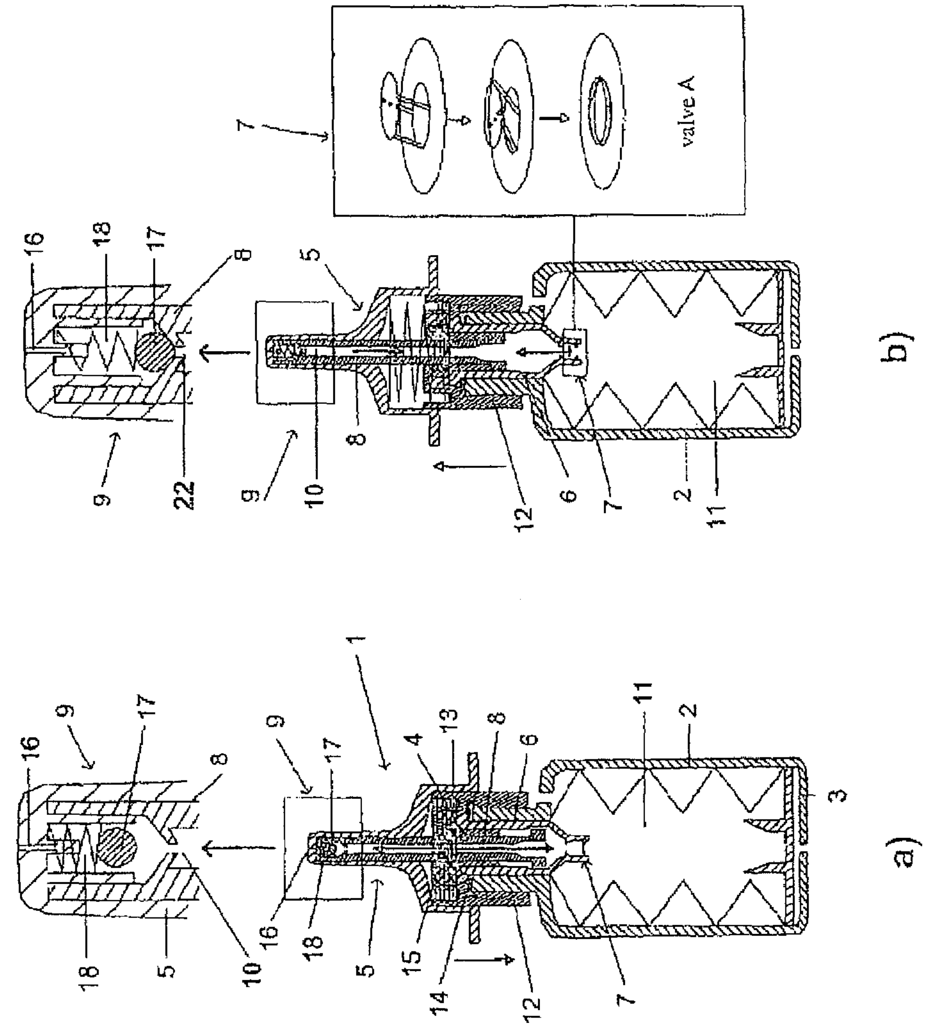
FIG. 1 shows a first variant of a metering device according to the invention with bellows.

In FIG. 1, a first metering device according to the invention is illustrated, FIG. 1*a* showing the metering device when the metering head is pressed, whilst FIG. 1*b* shows the metering device in the retracted position, i.e. when relaxing.

FIG. 1 shows a metering device 1 which has a storage container 2 with a base 3. Bellows 11 are disposed in the storage container 2. An opening 4 into which a metering head 5 is inserted is disposed on the side situated opposite the base. The metering head thereby has a pump housing 6, an inlet valve 7 which protrudes into the storage container 2 and also an outlet valve 9. The inlet valve 7 is connected to the outlet valve 9 via a through-channel 10 which is disposed in a spindle 8.

The outlet valve 9 is illustrated in addition in enlarged representation, the metering head 5 having an opening 16 and a ball 17 which serves for closure of the through-channel 10 with the help of a spring 18 being disposed in the inside of the metering head.

Likewise, the closing mechanism of the inlet valve 7, in the form of a plastic material valve, is illustrated in enlarged representation.

The metering head 5 is connected to the storage container 2 via a locking connection 12, sealing being effected here via a first gasket 14 and also a second gasket 15 which is disposed between the spindle 8 and the locking connection 12. The metering head 5 is thereby connected to the locking connection 12 via a spring 13 which is disposed between the inside of the metering head 5 and the locking connection 12.

When the metering head 5 is pressed, the spindle 8 is moved in the direction of the storage container 2 and produces an increased internal pressure in the interior of the pump housing 6. Because of the increased internal pressure, the inlet valve 7 is closed, whilst the outlet valve 9 is closed by the ball 17 being pressed against the spring 18 because of the internal pressure. As a result, the solution can escape out of the opening 16.

The process of relaxation is illustrated in FIG. 1*b*. As a result of escape of the solution, the internal pressure in the interior of the pump housing 6 is reduced. Consequently, the spring 18 returns to its initial state and presses the ball 17 downwards so that the outlet valve 9 is closed. Since the spindle 8 is moved upwards and the outlet valve 9 is closed, the result is a pressure decrease in the interior of the pump housing 6, as a result of which the inlet valve 7 is opened. Subsequently, a pressure equalisation between the interior of the pump housing 6 and the bellows 11 is effected. At the moment at which the metering head 5 returns to its initial position, the internal pressure in the region of the pump housing 6 is almost equalised and the inlet valve 7 is closed.

Upon release of the pump head, an upwards movement of the spindle 8 is effected. As a result, suction is produced in the interior of the pump housing 6 and of the through-channel 10. This suction causes the inflow of fluid through the inlet valve 7 simultaneously into the interior of the pump housing 6 and of the through-channel 10 and, on the other hand, causes secure suction of the upper valve seal, i.e. of the ball 17 towards the lower outlet opening 22 of the spindle channel. This has the result that the inlet valve 7 and the outlet valve 9 are never opened at the same time.

Figure 2:
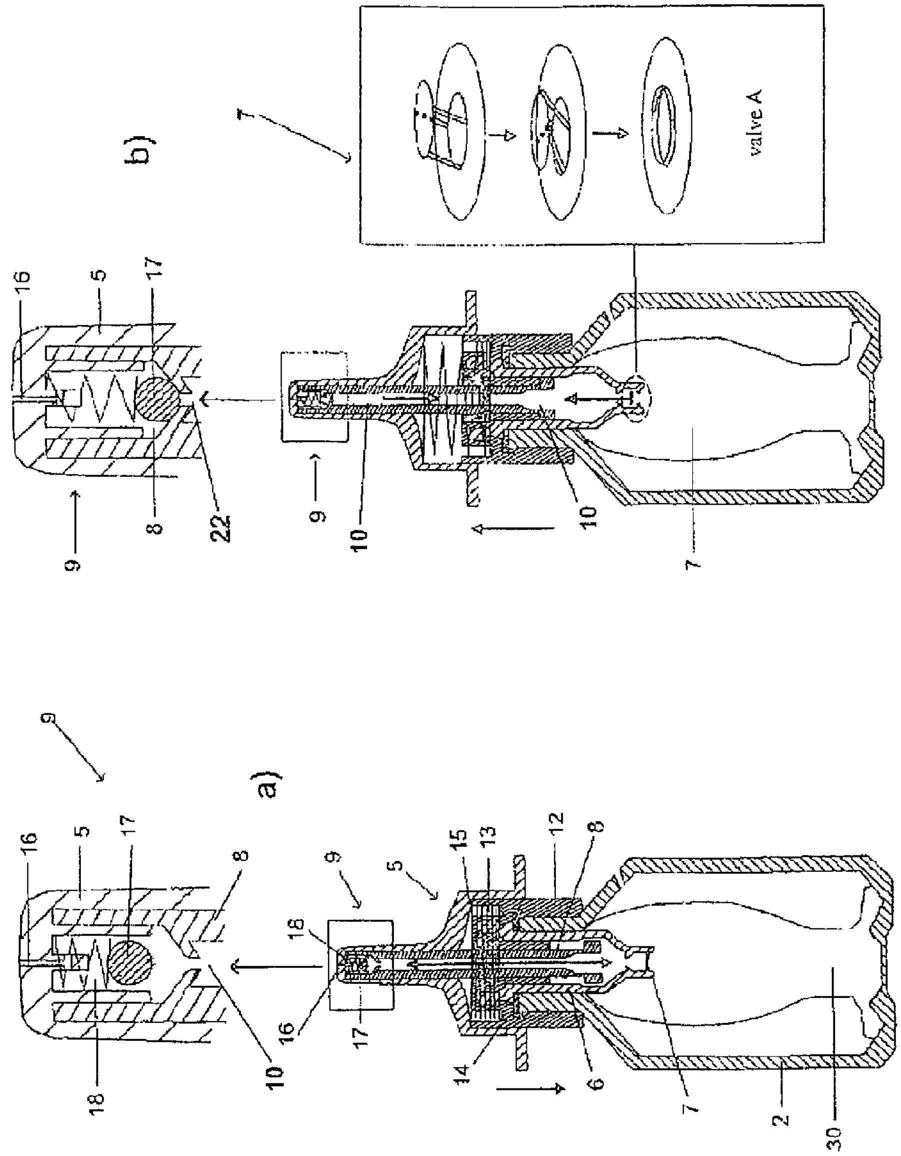
FIG. 2 shows a second variant of a metering device according to the invention with an inner bag.

In FIG. 2, a metering device 1 which is comparable to FIG. 1 is illustrated, which, instead of bellows, has an inner bag 30 in the storage container 2.

The metering device is also illustrated here in FIG. 2*a* when the metering head is pressed, whilst FIG. 1*b* shows the metering device in the retracted position, i.e. when relaxing.

When the metering head 5 is pressed, the spindle 8 is moved in the direction of the storage container 2 and produces an increased internal pressure in the interior of the pump housing 6. Because of the increased internal pressure, the inlet valve 7 is closed, whilst the outlet valve 9 is closed by the ball 17 being pressed against the spring 18 because of the internal pressure. As a result, the solution can escape out of the opening 16.

The process of relaxation is illustrated in FIG. 2*b*. As a result of the escape of the solution, the internal pressure in the interior of the pump housing 6 is reduced. Consequently, the spring 18 returns to its initial state and presses the ball 17 downwards so that the outlet valve 9 is closed. Since the spindle 8 is moved upwards and the outlet valve 9 is closed, the result is a pressure decrease in the interior of the pump housing 6, as a result of which the inlet valve 7 is opened. Subsequently, a pressure equalisation between the interior of the pump housing 6 and the inner bag 30 is effected. At the moment at which the metering head 5 returns to its initial position, the internal pressure in the region of the pump housing 6 is almost equalised and the inlet valve 7 is closed.

Upon release of the pump head, an upwards movement of the spindle 8 is effected. As a result, suction is produced in the interior of the pump housing 6 and of the through-channel 10. This suction causes the inflow of fluid through the inlet valve 7 simultaneously into the interior of the pump housing 6 and of the through-channel 10 and, on the other hand, causes secure suction of the upper valve seal, i.e. of the ball 17, towards the lower outlet opening 22 of the spindle channel. This has the result that the inlet valve 7 and the outlet valve 9 are never opened at the same time.

Figure 3:
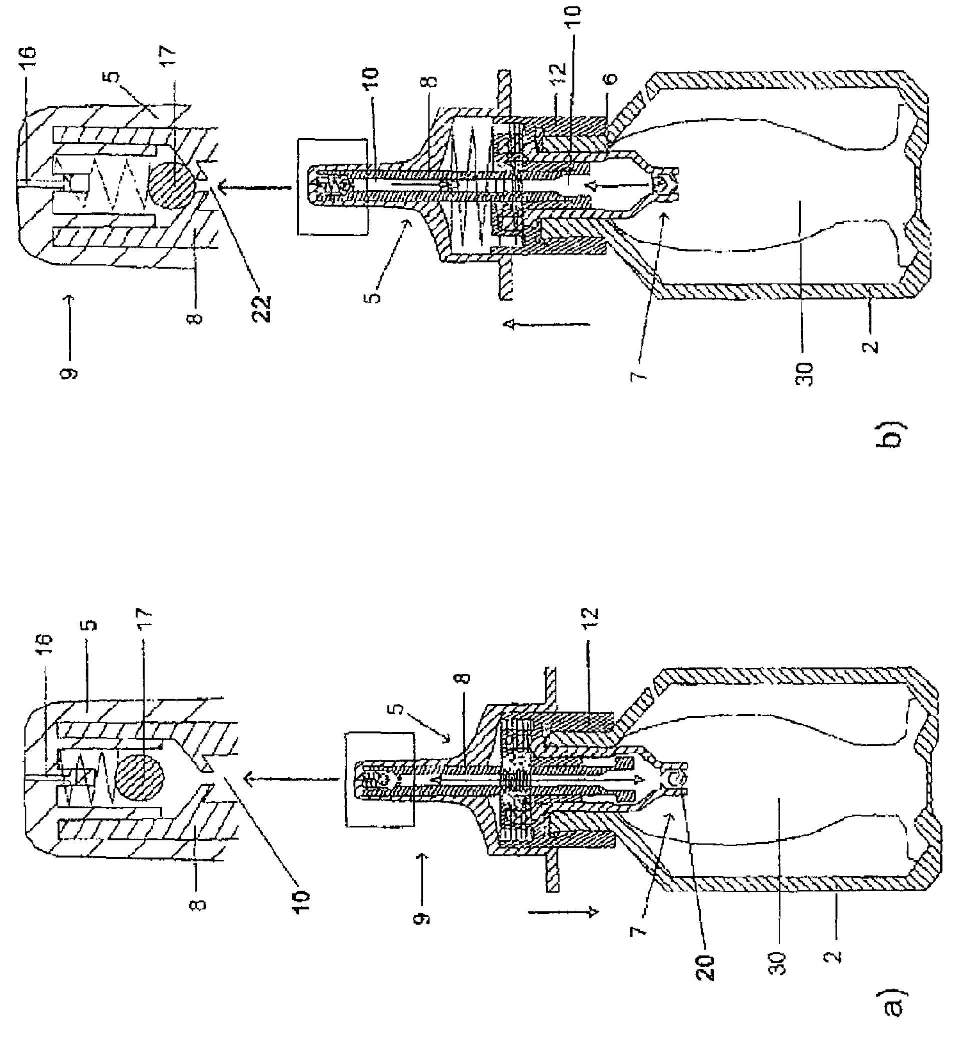
FIG. 3 shows a third variant of a metering device according to the invention with two ball valves and inner bags.

In FIG. 3, a metering device according to the invention which has an inner bag 30 analogous to FIG. 2 is illustrated. The additional difference of this metering device is that, instead of a plastic material valve as inlet valve 7, a ball valve with a metallic ball is used.

When the metering head 5 is pressed, the spindle 8 is moved in the direction of the storage container 2 and produces an increased internal pressure in the interior of the pump housing 6. Because of the increased internal pressure, the inlet valve 7 is closed by the ball 20 being pressed downwards because of the internal pressure whilst the outlet valve 9 is closed by the ball 17 being pressed against the spring 18 because of the internal pressure. As a result, the solution can escape out of the opening 16.

The process of relaxation is illustrated in FIG. 3*b*. Because of the escape of the solution, the internal pressure in the interior of the pump housing 6 is reduced. Consequently, the spring 18 returns to its initial position and presses the ball 17 downwards so that the outlet valve 9 is closed. Since the spindle 8 is moved upwards and the outlet valve 9 is closed, the result is a pressure decrease in the interior of the pump housing 6, as a result of which the inlet valve 7 is opened. Subsequently, a pressure equalisation between the interior of the pump housing 6 and the inner bag 30 is effected. At the moment at which the metering head 5 returns to its initial position, the internal pressure in the region of the pump housing 6 is almost equalised and the inlet valve 7 is closed.

Upon release of the pump head, an upwards movement of the spindle 8 is effected. As a result, suction is produced in the interior of the pump housing 6 and of the through-channel 10. This suction causes the inflow of fluid through the inlet valve 7 simultaneously into the interior of the pump housing 6 and of the through-channel 10 and, on the other hand, causes secure suction of the upper valve seal, i.e. of the ball 17 towards the lower outlet opening 22 of the spindle channel. This has the result that the inlet valve 7 and the outlet valve 9 are never opened at the same time.

Figure 4:
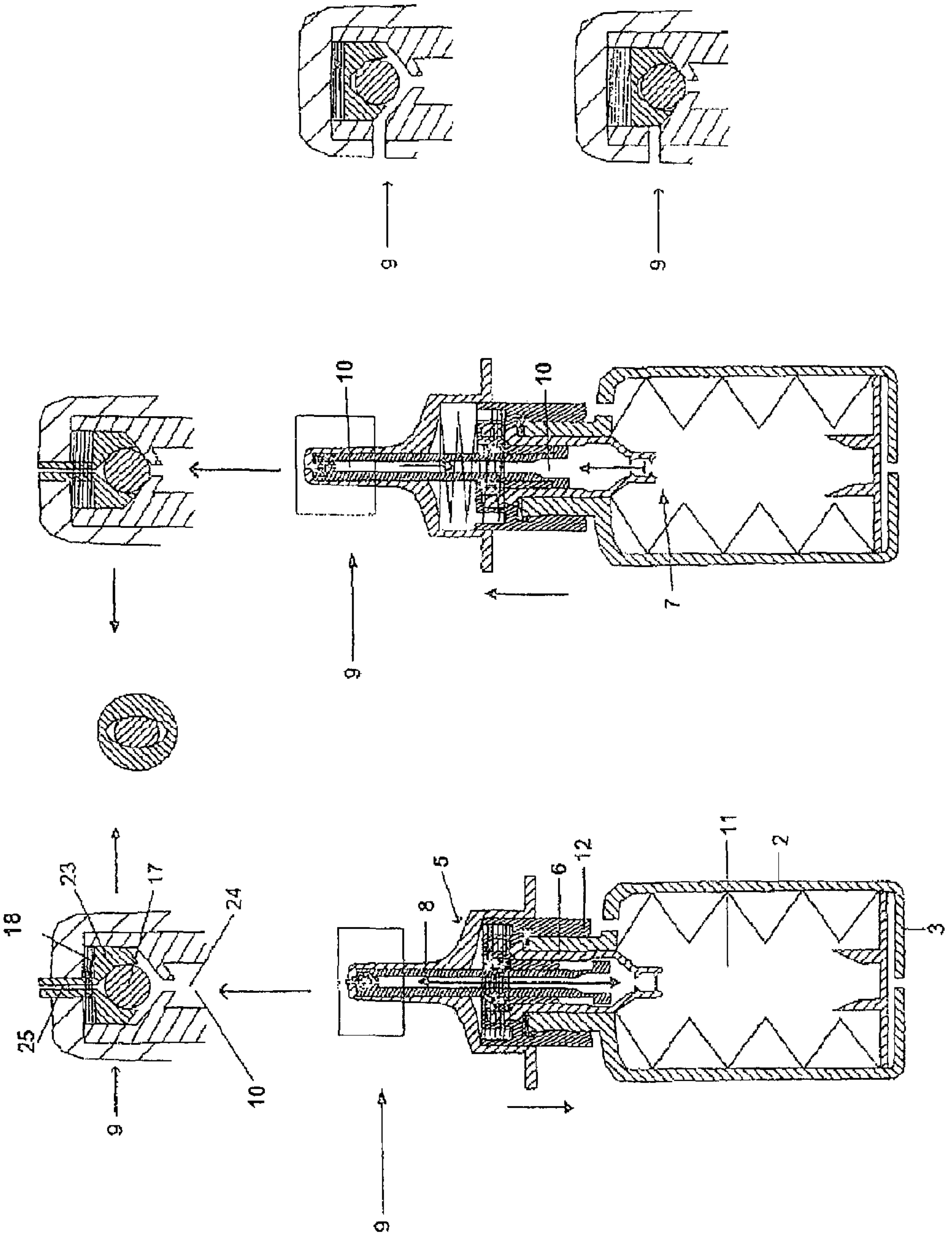
FIG. 4 shows a fourth variant of a metering device according to the invention.

In FIG. 4, a metering device 1 which is comparable to FIG. 1 is illustrated and has a cone 23 in addition to a spring 18 in the outlet valve 9.

A cone 23 with outlet opening is mounted moveably between the ball 17 and the spring 18 and forms the upper region of the outlet valve 9. Upon actuation of the pump, the cone 23 is pressed downwards close to the ball 17 and the ball 17 is pressed towards the lower outlet opening 24 of the spindle channel.

At the same time, the fluid volume in the chamber of the outlet valve 9 is displaced practically completely by the cone 23, which is guided downwards, and escapes through the outlet opening 25 in the cone 23 to the exterior, as a result of which the residual volume in the valve chamber is minimised. Escape of the fluid at the side of the cone 23 is not effected since an outlet opening 25 is present in the cone 23. After emergence of the fluid, the cone 23 remains pressed downwards by the inner spring 18 so that the ball 17 is pressed securely towards the outlet opening 24 of the spindle channel, i.e. the valve forms a tight seal.

Upon release of the pump head, an upward movement of the spindle 8 is effected. As a result, suction is produced in the interior of the pump housing 6 and of the through-channel 10. This suction causes the inflow of fluid through the inlet valve 7 simultaneously into the interior of the pump housing 6 and of the through-channel 10 and, on the other hand, causes secure suction of the upper valve seal, i.e. the ball 17, towards the lower outlet opening 24 of the spindle channel. This has the result that the inlet valve 7 and the outlet valve 9 are never opened at the same time.

Alternatively, a plastic material valve can also be present instead of the ball 17. In this case, the cone then also has a flat configuration at the bottom in order to exert as close a contact as possible with the valve seal.

Figure 5:
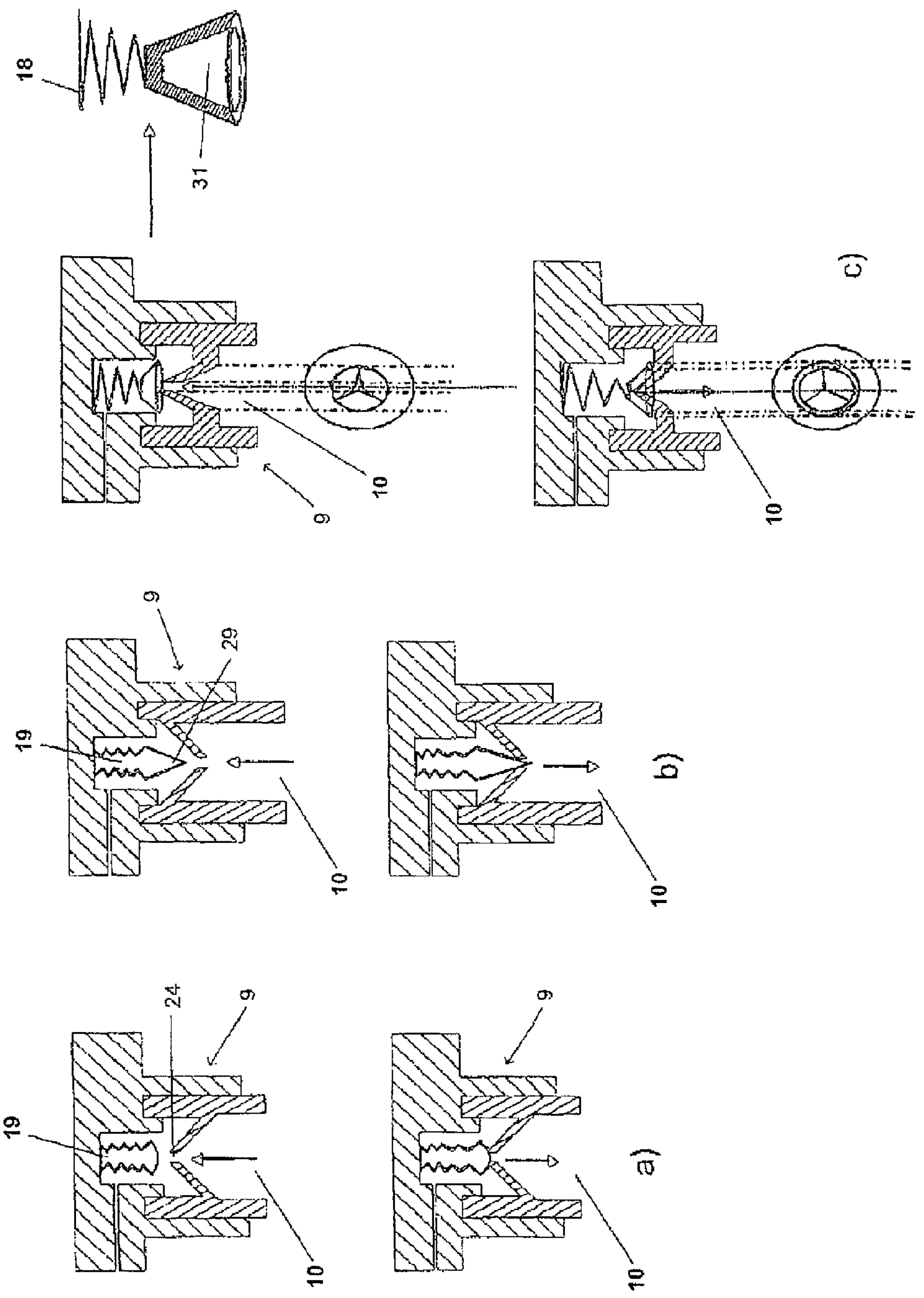
FIG. 5 shows variants according to the invention of an outlet valve.

FIG. 5 shows various embodiments of the outlet valve 9.

Thus FIG. 5*a* shows a variant in which bellows 19 are provided instead of a ball. These bellows are pressed upwards when internal pressure is present, whilst, with relaxation, i.e. reduction in the inner pressure in the interior, the bellows are moved in the direction of the outlet opening 24 of the spindle channel and seal this tightly.

FIG. 5*b* shows a variant in which bellows 19 are provided with a conically tapering tip 29. The conically tapering tip is moved here upon relaxation in the direction of the outlet opening 24 of the spindle channel so that the outlet opening 24 is closed and sealed by the tip 29.

FIG. 5*c* shows a variant with a spring 18 which is provided with a plastic material cone 31 in the direction of the outlet opening. The plastic material cone 31 is moved here upon relaxation in the direction of the outlet opening 24 of the spindle channel, is placed on the latter and thus closes the outlet opening 24.

Figure 6:
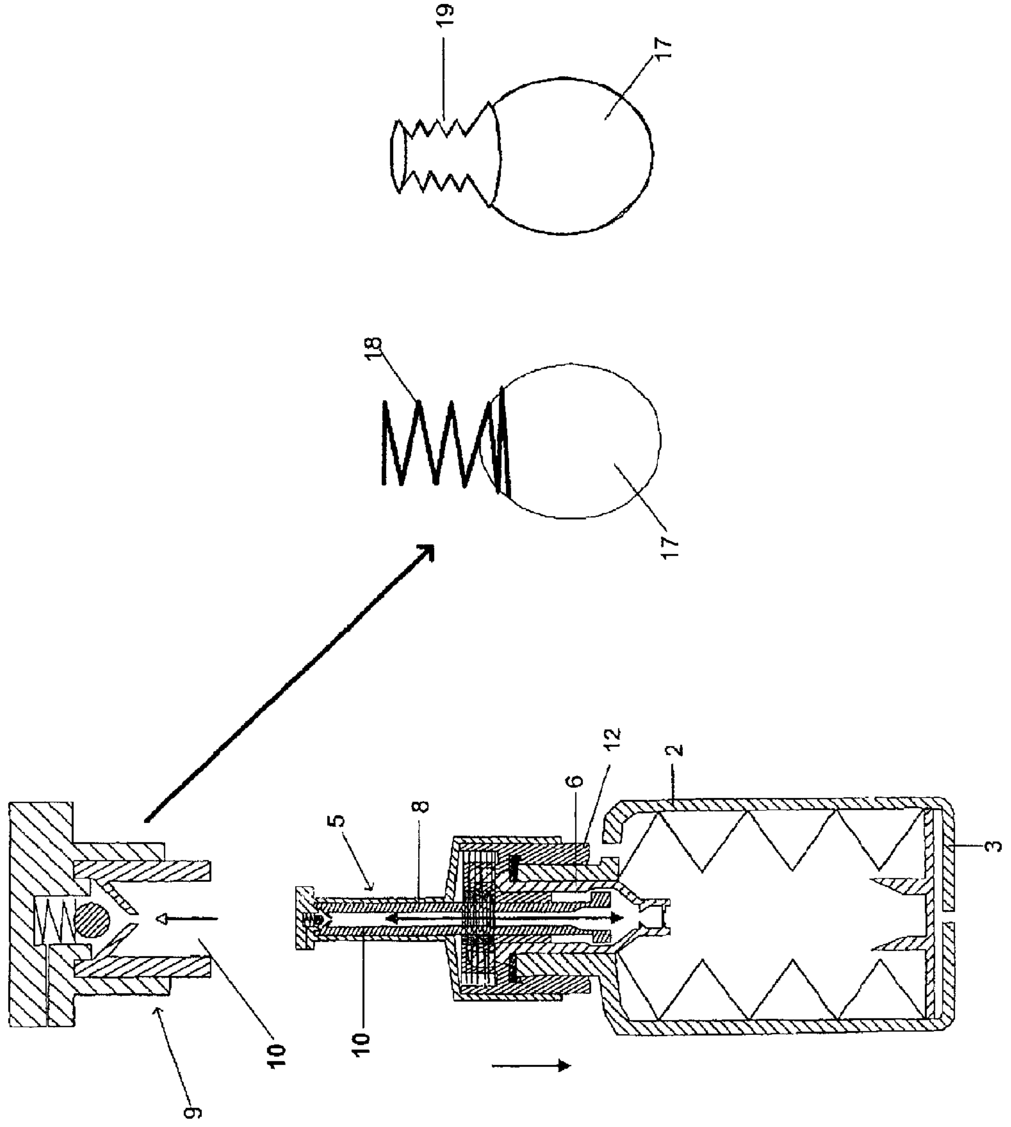
FIG. 6 shows a further variant of an outlet valve according to the invention.

FIG. 6 shows a further embodiment of the outlet valve 9. It is shown here that bellows 19 can also be used instead of a spring 18 in order to effect the restoring force for the ball 17.

Figure 7:
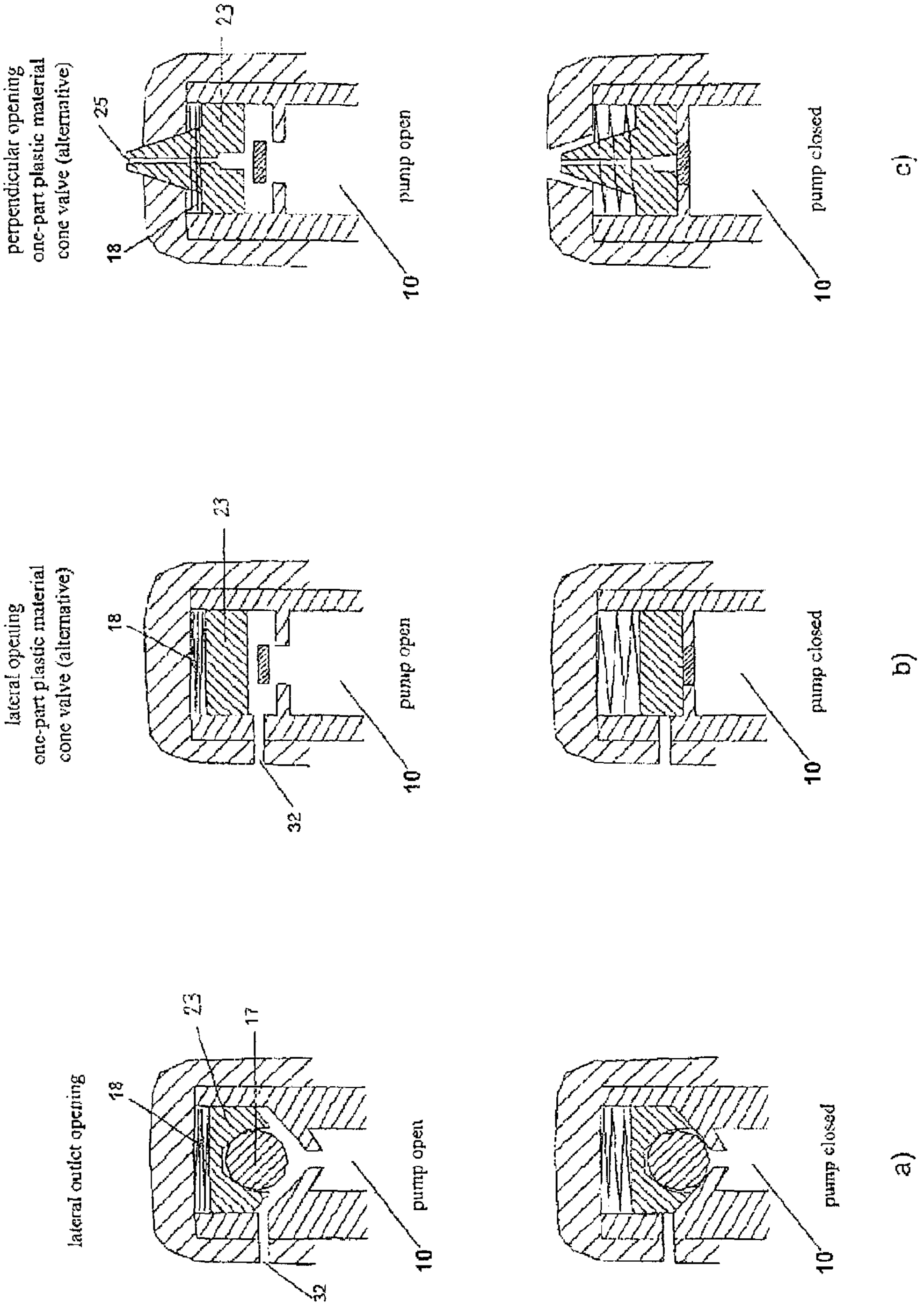
FIG. 7 shows further variants according to the invention of an outlet valve.

FIG. 7 shows further variants of the outlet valve 9.

In FIG. 7*a*, a variant with a ball 17, a cone 23 and a spring 18 is illustrated. A lateral outlet channel 32, via which the solution can exit, is disposed here.

FIG. 7*b* shows a variant with a one-part plastic material cone 23 and a spring 18. A lateral outlet channel 32 is disposed here also.

FIG. 7*c* shows a variant with a one-part plastic material cone 23 and a spring 18. Escape of the fluid at the side of the cone 23 is not effected here since an outlet opening 25 is present in the cone 23.

Figure 8:
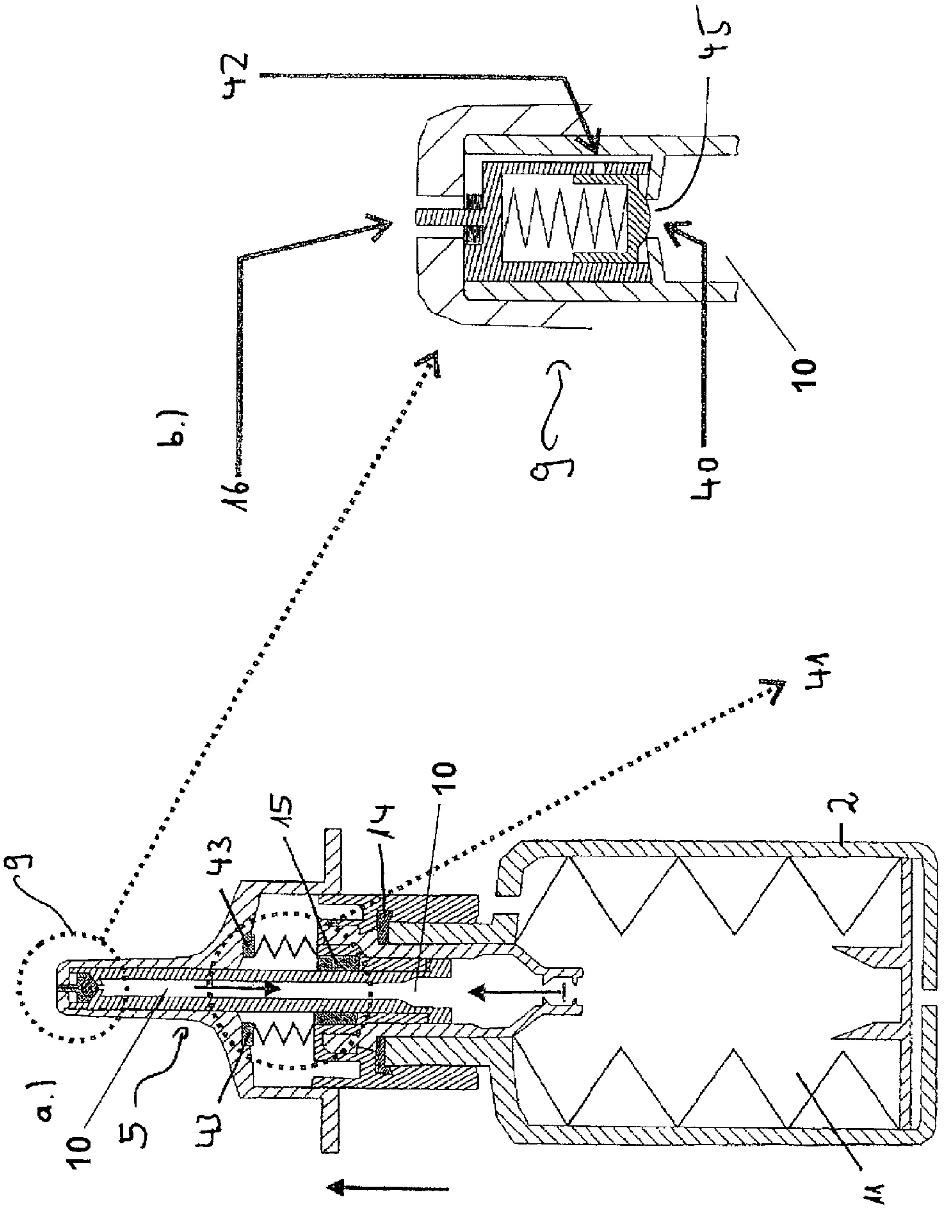
FIG. 8 shows a further embodiment with bellows in the metering head and a valve piston in the outlet valve.

FIG. 8 now shows a further embodiment of the metering device according to the invention. In FIG. 8*a*, again the complete metering device with the metering head 5 and the storage container 2 is thereby illustrated. An essential element of this embodiment is that bellows 41 are disposed in the metering head between the inside of the metering head 5 and the locking connection 12. The embodiment according to FIG. 8*a* thereby provides one-part elastic bellows 41 which have in addition an integrated sealing function on both sides. For this purpose, the elastic bellows 41 are connected to sealing elements 43 which then enable optimum sealing of the bellows in the direction of the inside of the metering head. The further construction corresponds to that as described in detail in the preceding Figures. The metering head 5 has another modification with respect to the outlet valve 9 as a further alternative here. The outlet valve 9 is now constructed as a modification of the already described embodiment such that a valve piston 40 is provided here instead of the ball. The valve piston 40 is thereby configured such that it has a semicircular bulge on its side directed towards the opening so that the valve opening 45 can be closed. A further advantage of the embodiment according to FIG. 8*b* resides in the fact that a lateral valve opening 42 through which then the fluid to be transported is conveyed in the direction of the outlet can be provided.

As a crucial advantage of this embodiment, it should be mentioned that the bellows 41 are configured as elastic bellows and, as a result of the integrated sealing function thereof, allow optimum operation of the metering device.

What is claimed is:

1. A metering device for metered dispensing of a fluid, comprising:

a) a storage container with an opening which is disposed on the side opposite a base, b) a metering head which is connected, in the operating state, to the opening and has i) an outlet valve, ii) a pump housing which is connected to the inside of the opening and has an inlet valve which is disposed in the direction of the interior of the storage container, the metering head having a spindle which has a through-channel which connects the outlet valve and the inlet valve, wherein there is provided, at the opening of the storage container, a locking connection which connects the pump housing to the storage container and to the metering head, and wherein, in the metering head, a spring or bellows with an integrated sealing function is/are disposed between the inside of the metering head and the locking connection and is/are in operating connection with the locking connection, wherein the inlet valve is a plastic material disk valve, wherein there is disposed, in the storage container, bellows which are connected to the pump housing to form a seal, wherein the bellows have a contact device at at least one fold which is in contact with the inside of the storage container, and wherein the outlet valve is formed by a cone with an outlet opening which cooperates with a ball and a spring.

2. The metering device according to claim 1, wherein the storage container is a cylindrical container and the opening is disposed in a tapered region which is configured as a neck.

3. The metering device according to claim 1, wherein the locking connection is connected via a first gasket to the opening of the storage container.

4. The metering device according to claim 1, wherein a second gasket is provided between the locking connection and the spindle.

5. The metering device according to claim 1, wherein the bellows have a drag piston.

6. The metering device according to claim 1, wherein the bellows consists of plastic materials, selected from PA, PET, PTEE, PP, PE or PU.

7. A method of using the metering device according to claim 1, comprising the step of actuating the metering head to meter fluid or semi-solid contents.

8. The metering device according to claim 1, wherein the outlet valve is formed by an opening in the metering head which cooperates with a ball, with a spring, bellows or a valve piston, or is formed by a plastic material cone with spring.

9. The metering device according to claim 8, wherein the spring is a metal spring, a metal spring coated with plastic material or a plastic material spring.

10. The metering device according to claim 1, wherein the material of the metering head, of the pump housing and of the storage container is selected from the following plastic materials: PA, PET, PTEE, PP, PE or PU.

11. The metering device according to claim 10, wherein the material of the metering head preferably comprises silver as additive in the region of the outlet opening.

12. The metering device according to claim 1, wherein the spindle is guided in the metering head and pump housing and has a central boring which forms the through-channel.

13. The metering device according to claim 12, wherein the through-channel is widened in the direction of the inlet valve.

14. The metering device according to claim 12, wherein the through-channel is dimensioned in the direction of the outlet valve such that the outlet valve can engage.

* * * * *